United States Patent
Lundquist et al.

(10) Patent No.: US 12,434,487 B1
(45) Date of Patent: Oct. 7, 2025

(54) METHOD AND SYSTEM FOR PRODUCING CEREAL PIECES WITH PRINTED IMAGES

(71) Applicant: General Mills, Inc., Minneapolis, MN (US)

(72) Inventors: Craig S. Lundquist, Richfield, MN (US); Bruce J. Button, Minneapolis, MN (US); Troy Alan Heuring, Waverly, MN (US); Goeran Walther, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 416 days.

(21) Appl. No.: 17/987,133

(22) Filed: Nov. 15, 2022

(51) Int. Cl.
*B41J 3/407* (2006.01)

(52) U.S. Cl.
CPC ..................... *B41J 3/407* (2013.01)

(58) Field of Classification Search
CPC . B41J 3/407; A21D 13/47; A21D 8/02; A21D 8/06; A21C 14/00; A21C 11/10; A21C 11/00; A21C 11/04; A21C 11/12; A21C 1/02; A21C 15/04; A21C 15/007
See application file for complete search history.

(56) References Cited

U.S. PATENT DOCUMENTS

| | | | |
|---|---|---|---|
| 3,356,469 A | 12/1967 | Stephenson et al. | |
| 3,839,821 A | 10/1974 | Forsman | |
| 5,665,400 A | 9/1997 | Vrouwenvelder | |
| 6,652,897 B1 | 11/2003 | Stewart | |
| 6,893,671 B2 | 5/2005 | Ben-Yoseph et al. | |
| 7,311,045 B2 | 12/2007 | Ackley, Jr. et al. | |
| 7,500,744 B2 | 3/2009 | Shastry et al. | |
| 7,933,443 B2 | 4/2011 | Wen et al. | |
| 8,960,836 B2 | 2/2015 | Martin | |
| 9,113,647 B2 | 8/2015 | Liniger et al. | |
| 9,357,800 B2 | 6/2016 | Willcocks et al. | |
| 10,092,020 B2 | 10/2018 | Ream et al. | |
| 2001/0046535 A1 | 11/2001 | Bowling | |
| 2005/0003056 A1 | 1/2005 | Romanach et al. | |
| 2005/0281930 A1* | 12/2005 | Nowakowski | A21D 13/047 426/549 |
| 2006/0275532 A1 | 12/2006 | Dechert | |

(Continued)

FOREIGN PATENT DOCUMENTS

| | | |
|---|---|---|
| FR | 2751451 | 1/1998 |
| GB | 2367996 | 4/2002 |

(Continued)

*Primary Examiner* — Geoffrey S Mruk
(74) *Attorney, Agent, or Firm* — Jordan IP Law, LLC; John L. Crimmins, Esq.

(57) ABSTRACT

A method and system for mass producing cereal pieces provides images on the cereal pieces. In particular, the invention is directed to incorporating a printing operation into a cereal production process, wherein a series of printing operations are performed for each cereal piece such that a common image is printed on an exposed face portion and then re-printed multiple times on the image in order to effectively establish a sharp, discernible image on the resulting cereal piece. In addition, the process includes performing each printing operation in a timed and controlled sequence with a cereal piece cutting operation such that the final image is located entirely within a periphery of the resulting cereal piece. In a preferred embodiment, the images constitute emojis.

28 Claims, 4 Drawing Sheets

(56) References Cited

U.S. PATENT DOCUMENTS

| | | | |
|---|---|---|---|
| 2007/0231425 A1* | 10/2007 | Ream | B05B 13/0447 |
| | | | 426/3 |
| 2007/0237869 A1 | 10/2007 | Akutagawa | |
| 2011/0117256 A1 | 5/2011 | Palmgren et al. | |
| 2011/0244089 A1 | 10/2011 | Shastry et al. | |
| 2018/0272745 A1* | 9/2018 | Ichioka | B41J 2/2135 |

FOREIGN PATENT DOCUMENTS

| | | |
|---|---|---|
| KR | 20030057914 | 7/2003 |
| KR | 101910596 | 10/2018 |
| WO | WO 2002/071307 | 9/2002 |

* cited by examiner

METHOD AND SYSTEM FOR PRODUCING CEREAL PIECES WITH PRINTED IMAGES

FIELD OF THE INVENTION

The present invention relates to food products and, more particularly, to a method and system for mass producing cereal pieces with images printed thereon. In particular, the present invention relates to the mass production of ready-to-eat cereal pieces with images printed entirely within peripheries of exposed face portions of the cereal pieces.

BACKGROUND OF THE INVENTION

A wide variety of food products are prepared from cooked cereal doughs, especially ready-to-eat ("RTE") or breakfast cereals, as well as a variety of snack products. Generally, in the preparation of the cooked cereal dough, cereal or farinaceous ingredients, such as various grain-based cereal flours, are first admixed with other dry ingredients such as salt, minerals, starch, sugars, to form a dry blend of ingredients and then is further blended with various liquid ingredients, including water, sheared and heated to gelatinize or cook the starch fraction of the cereal ingredients and other starchy materials. The gelatinized or cooked mass is then worked to form a homogenous or well blended cooked cereal dough which can be further processed to produce a wide range of cereal pieces.

Even though a wide range of cereal products are available on the market, there is a continual need to develop new cereal products which are particularly appealing to customers. Efforts in producing new, appealing products have taken many approaches, including unique product shaping, final product finishing techniques such as coatings or toppings, variations in product coloring, and the like. Regardless, there still exists a need in the food art for the introduction of cereal products providing unique appeal, such as by presenting attributes which are exciting and fun, while advancing brand recognition.

SUMMARY OF THE INVENTION

The present invention is concerned with a method and system for mass producing cereal pieces with images printed thereon, particularly discernible images entirely within peripheries of exposed face portions of the cereal pieces. In particular, the invention is directed to incorporating a printing operation into a cereal production process, wherein a series of printing operations are performed for each resulting cereal piece such that a common image is printed on an exposed face portion and then re-printed multiple times upon itself in order to effectively establish a discernible image on the resulting cereal product. In addition, the process includes performing each printing operation in a timed sequence with a cereal piece cutting operation such that the final image is located entirely within a periphery of the resulting cereal piece.

In accordance with a particular embodiment of the invention, the method includes directing a strip of dough material along a conveyor, with the strip having an exposed face portion. The strip of dough is directed to a printing assembly which creates a series of images upon successive regions of the exposed face portion of the strip, wherein creating each image includes printing the image in a section of the exposed face portion and re-printing the image upon itself in the section of the exposed face portion, preferably multiple times. Thereafter, the strip is cut into individual food pieces, with each food piece including a periphery and having the image being located entirely within the periphery. Depending on specifications of the cereal being produced, further finishing processes are performed on the individual food pieces in establishing the final cereal pieces having the images thereon.

Additional objects, features and advantages of the invention will become more fully apparent upon consideration of the following detailed description of the invention when taken in conjunction with the drawings wherein like reference numerals refer to corresponding parts in the several views.

DETAILED DESCRIPTION OF THE INVENTION

Figure 1:
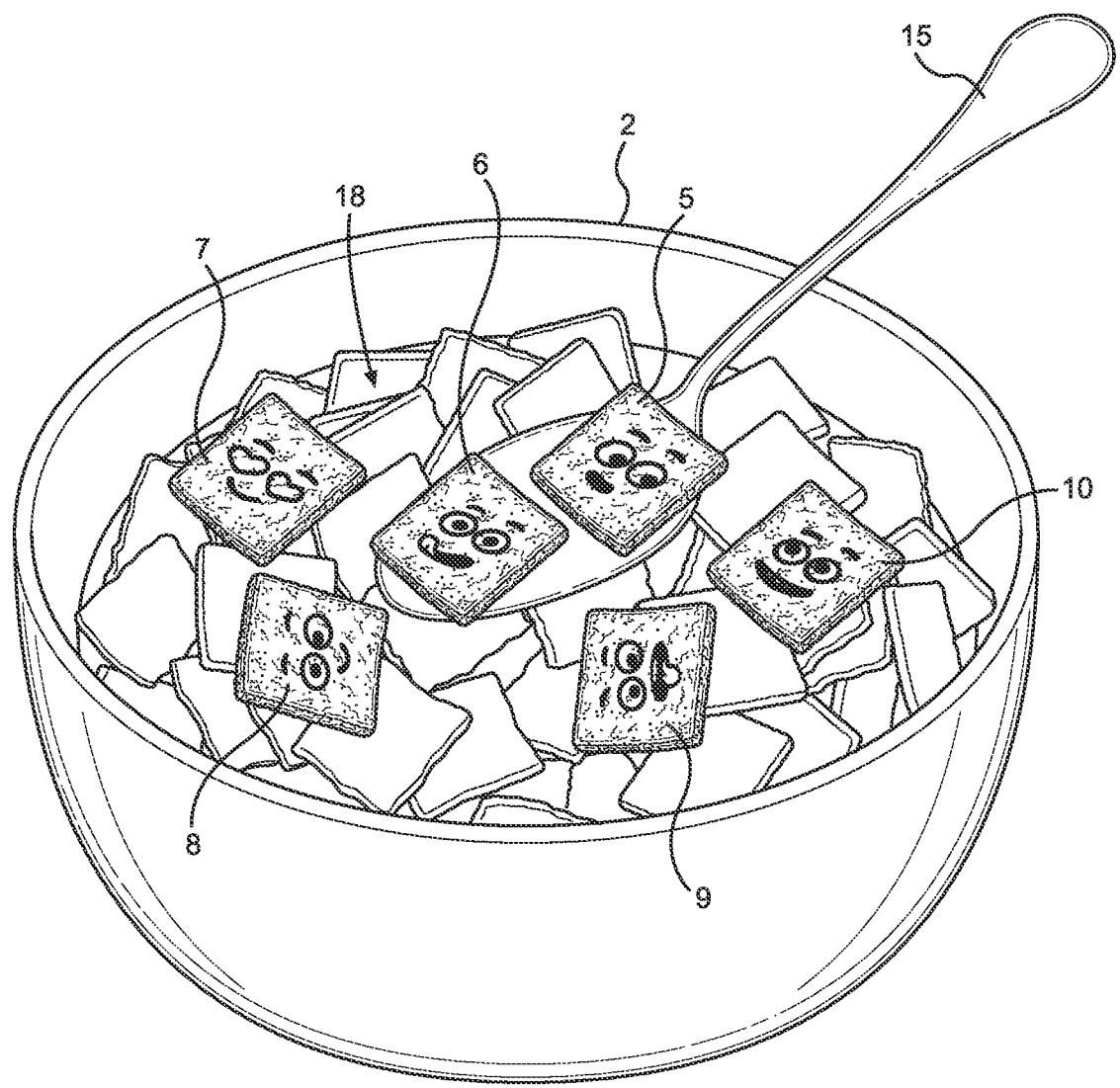
FIG. 1 is a perspective view of a bowl of cereal including various cereal pieces made in accordance with the invention.

The present invention relates to making cereal pieces with printed images. With initial reference to FIG. 1, a bowl 2 containing various cereal pieces 5-10 with representative images produced in accordance with the invention is depicted. As shown, cereal pieces 5 and 6 are supported on a spoon 15, while cereal pieces 7-10 are randomly mixed with various other cereal pieces, generically indicated at 18, within bowl 2. Cereal pieces 18 can also be printed with images, or cereal pieces 5-10 can be mixed with cereal pieces 18 which lack any printed images. A preferred system for the production of cereal pieces 5-10 will be detailed below. However, at this point, it should be noted that the particular images represented on cereal pieces 5-10 are presented for exemplary purposes, with a wide range of images, preferably emojis, being available for use in connection with the overall invention.

Figure 2:
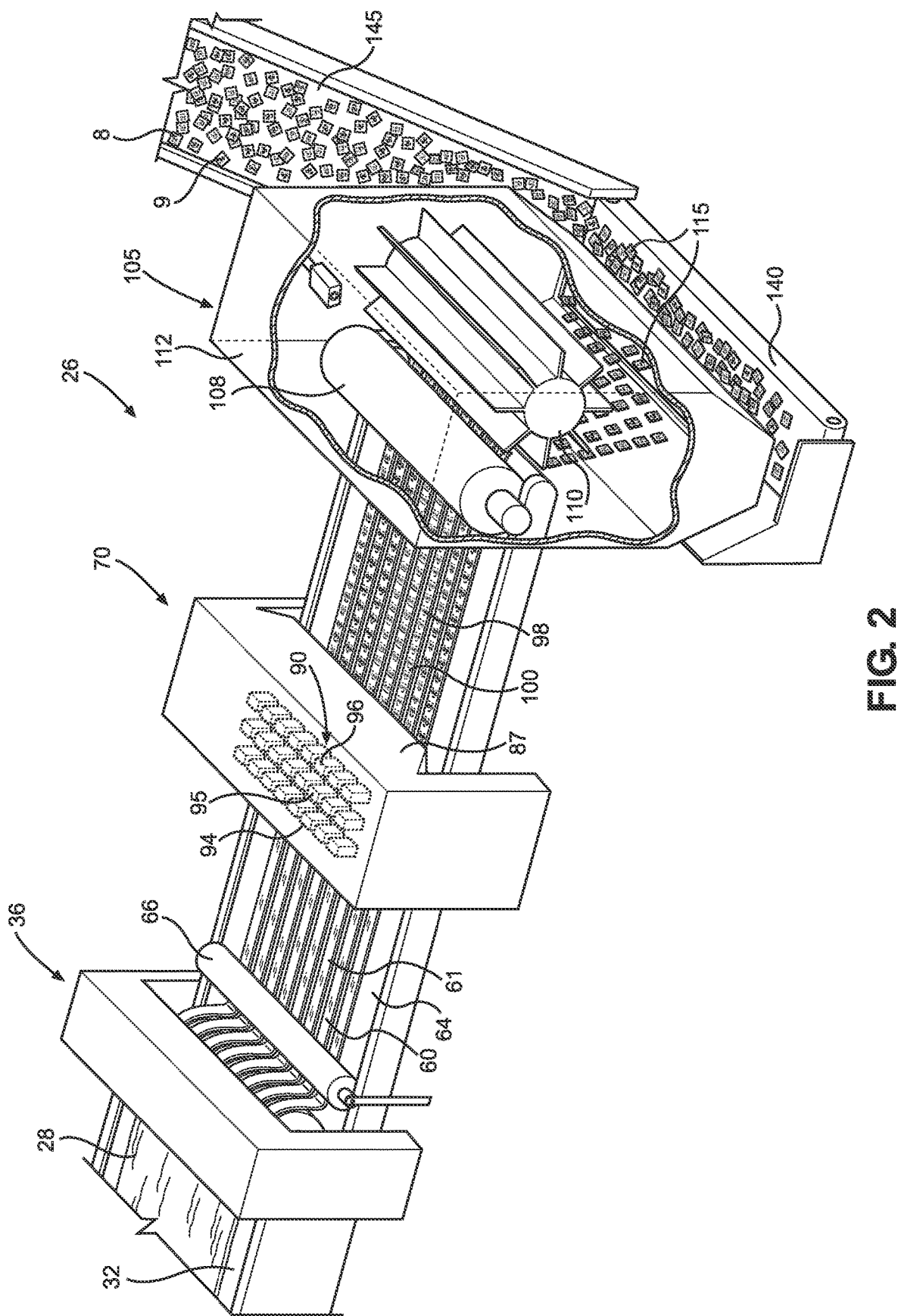
FIG. 2 illustrates a production line employed to make the cereal pieces shown in FIG. 1.

With reference to FIG. 2, a production line or system 26 for the automated mass production of cereal pieces 5-10 will now be described. As shown, system 26 has a sheet of cooked cereal dough 28 traveling longitudinally along a conveyor 32. Initially, dough sheet 28 is directed to a slitter assembly 36 which functions to cut dough sheet 28 into a plurality of strips, two laterally spaced strips of which are labeled 60 and 61. Slitter assembly 36 can take a variety of forms known in the art, such as a roller with laterally spaced, rotating blades. After slitter assembly 36, the plurality of strips 60 and 61 are re-directed down onto a lower conveyor 64. More specifically, the strips 60 and 61 are directed about a locator unit 66, shown in the exemplary embodiment as taking the form of a lower roll bar, positioned directly downstream of slitter assembly 36. Locator unit 66 functions to maintain the plurality of strips 60 and 61 in direct contact with lower conveyor 64 which directs the plurality of strips 60 and 61 to a printing assembly 70.

Printing assembly 70 includes an outer housing 87, shown in the illustrated embodiment as spanning conveyor 64. Importantly, printing assembly 70 includes various sets of longitudinally aligned print units, one of which is indicated at 90. More specifically, each set of aligned print units 90 includes a number of longitudinally spaced print heads 94-96, all of which are preferably ink jet print heads positioned directly above a travel path of a respective strip 60, 61. With this arrangement, as each strip 60, 61 is directed through printing assembly 70, print heads 94-96 are successively activated through a controller (not shown) to print an image upon the strip 60, 61. More specifically, using strip 61 as an example, print head 94 represents a first print head configured to print an image 98 on an exposed face portion 100 of strip 61 a first time. Immediately thereafter, print head 95, being a second print head, is configured to re-print the same image 98 upon itself in the same section of exposed face portion 100. In a corresponding manner, print head 96 operates as a third print head configured to again re-print the image 98 upon itself in the same section of exposed face portion 100. Therefore, in accordance with the invention, image 98 is actually, successively printed multiple times, i.e., at least 2, preferably at least 3 and, more preferably, 4 times with another print head (not shown) in the same location along strip 61. The same image can be printed with each print unit 90 or the images can vary across the different print units.

Of course, each of the plurality of strips 60, 61 is continuously moving in this automated manufacturing process such that each strip 60, 61 is continually printed at longitudinally adjacent sections of strips 60 and 61 as clearly shown in FIG. 2. Thereafter, strips 60 and 61 are led to a cutting unit 105 configured to simultaneously cut the plurality of strips 60 and 61. In a preferred embodiment, cutting unit 105 constitutes a rotary cutter, however cutting unit 105 can take other forms, including linear or guillotine, ultrasonic or the like cutting assemblies. In the embodiment shown, cutting unit 105 includes its own locator unit 108 taking the form of a roll bar positioned directly upstream of a rotatably driven cutter wheel 110 within a housing 112. Like locator unit 66, locator unit 108 functions to maintain the plurality of strips 60 and 61 in direct contact with lower conveyor 64 at a terminal end portion (not separately labeled) of lower conveyor 64. In any case, cutting unit 105 cuts each strip 60, 61 between successive sections containing images 98 in order to create a plurality of individual cereal pieces 115, each having a respective image 98 thereon.

Figure 3:
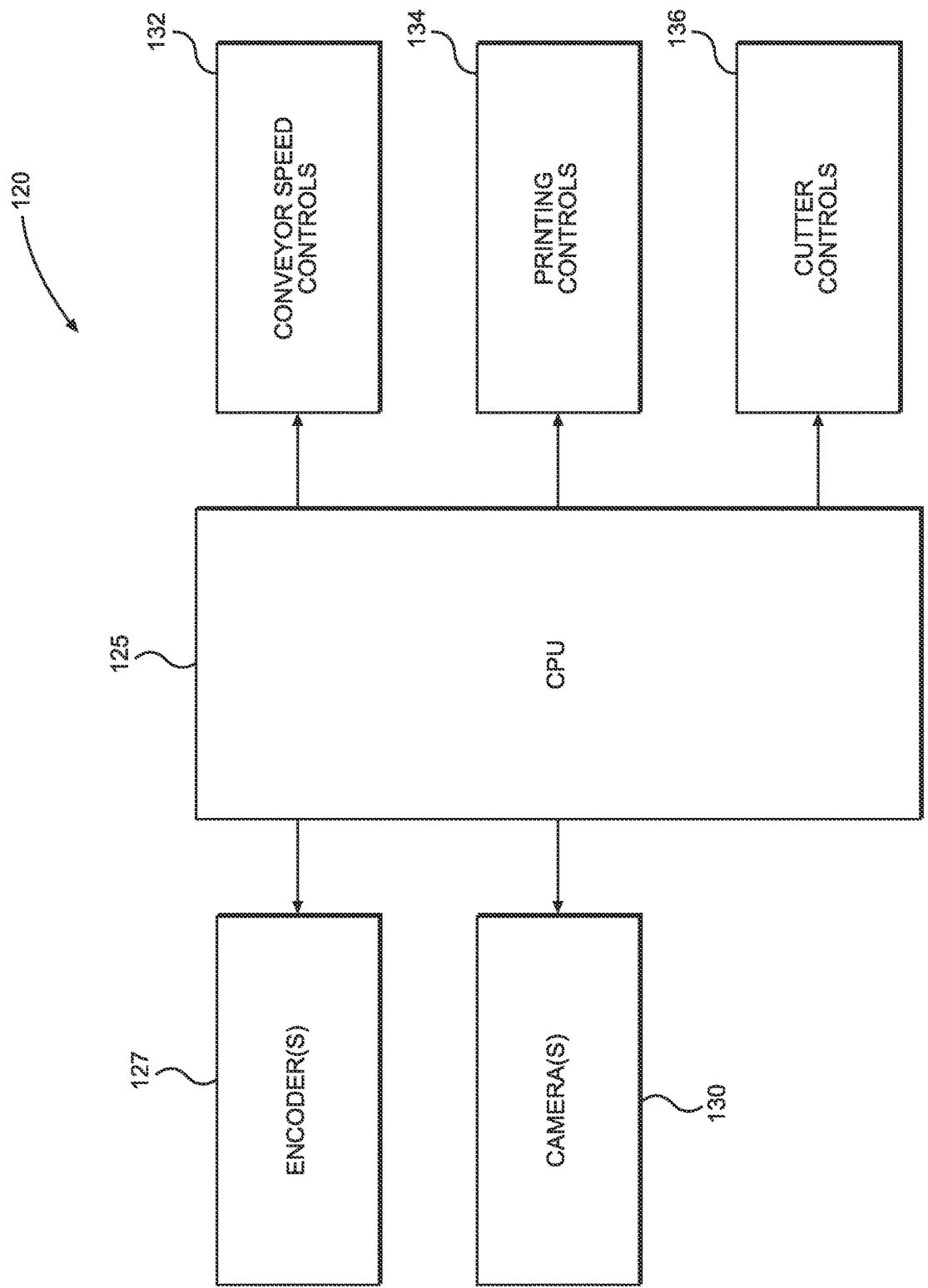
FIG. 3 is a schematic diagram of a control system for the production line.

During operation, the speed of conveyors 32 and 64, the print timing employed by printing assembly 100 and the rotational speed of cutter wheel 110 are synchronized through a control system (see 120 in FIG. 3 and discussed further below) to print the image 98 in a section of the exposed face portion 100 multiple times, transport strips 60, 61 with the printed images 98 thereon to cutting unit 105, and cut the strips 60, 61 into the individual cereal pieces 115 with the images 98 substantially centered thereon. In particular, the belt speed is maintained consistent so the strips 60, 61 are held on the belt without surging or slipping, and the frequencies of the printing and cutting is synchronized and controlled to ensure the centering of the printed images. FIG. 3 schematically illustrates control system 120 for production line 26 wherein a controller or CPU 125 receives signals from speed or position sensors (e.g., encoders) 127 to determine the operating speed of at least conveyors 32 and 64, as well as signals from one or more cameras 130, such as the high speed camera shown within housing 112 in FIG. 2 but not separately labeled. Based on received signals, output signals are sent from CPU 125 to conveyor speed controls 132, print controls 134 and cutter controls 136 to provide the requisite synchronization needed to assure that each image 98 is located in the desired section of a respective exposed face portion 100.

Referring back to FIG. 2, after being created, cereal pieces 115 are guided by housing 112 of cutting unit 105 to another conveyor 140 which, in the exemplary embodiment shown, directs the cereal pieces 115 to a further conveyor 145. At this point, cereal pieces 115 can be delivered to one or more finishing units (not shown). More specifically, in accordance with the invention, a wide range of finishing operations could be performed, including one or more drying, puffing, toasting, coating, topping or the like operations for the cereal pieces 115 with the images 98. By way of example, the pieces 115 could be further finished by the addition of a particulate topping, such as cinnamon, even to the extent of covering the images 98 until the cereal pieces 115 are exposed to milk in a bowl. These additional steps can be regulated through control system 120 or through a separate control arrangement.

Figure 4:
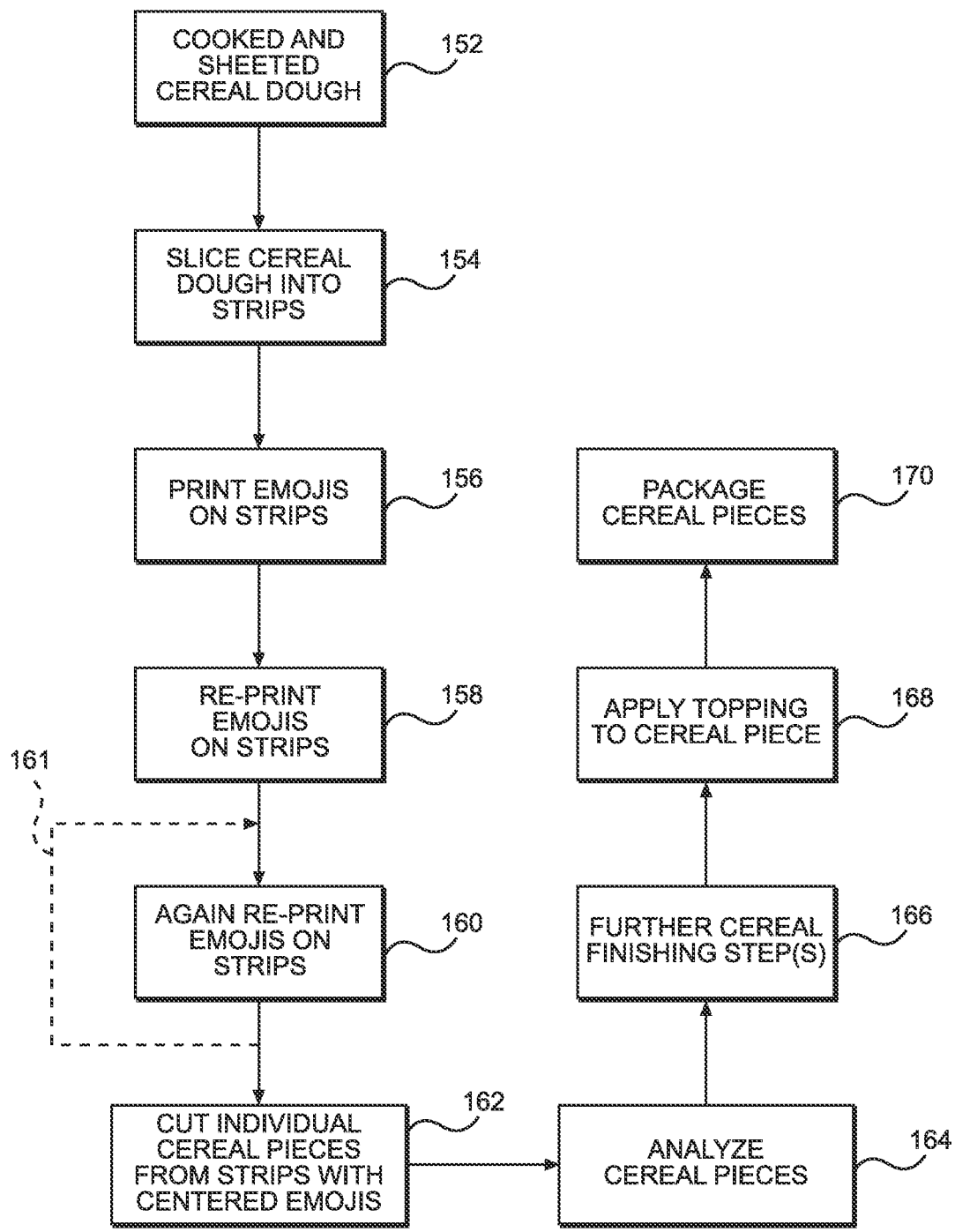
FIG. 4 is a flow diagram of the method employed in the production line represented in FIG. 2.

Although the steps associated with the present invention have been outlined above in detailing production line or system 26, reference will now be made to the flow chart of FIG. 4 in directly outlining related method steps. As shown, cereal dough 28 is formed and sheeted in step 152. Thereafter the cereal dough is cut into strips in step 154. Next, images, such as emojis, are printed on the strips in step 156. At a minimum, one re-print of the image is performed in step 158. However, as indicated above, it is preferred that three, four or possibly more image re-prints are done, as represented by step 160 and return line 161. Thereafter, the strips are cut into individual cereal pieces at step 162, with this step being synchronized with the printing and conveying operations such that the images are centered on the individual cereal pieces. As detailed above with particular reference to FIG. 3, an analysis is preferably conducted, such as through the use of one or more high speed cameras connected to a CPU, on the image containing cereal pieces, as indicated at step 164, for quality and operational parameter regulation or control purposes, i.e., to verify the print quality and assure the image is centered as desired such that the entire image is within a periphery of the cereal piece. As discussed above, various finishing operations can be performed on the cereal pieces, such as drying, puffing or toasting, in step 166, as well as even other finishing steps, like applying a topping, at step 168. Finally, the finished cereal pieces are packaged for shipping to retail establishments at step 170.

As can be imagined, obtaining sharp, high resolution images substantially centered on the small cereal pieces during mass production is no easy task. By way of a specific operational embodiment of the invention, cereal pieces having dimensions of approximately ¾" length and ½" width were printed with emoji images which were approximately ⅜" long and ⅜" wide. In any case, the percentage of the side or face surface area encompassed by the image of each piece can greatly vary, preferably between about 40-80% and, more preferably, between about 50-80% after drying and puffing. With this dimensional arrangement, a host of puzzling issues had to be addressed, including maintaining a consistent flow of the strips underneath the printer and into the cutting unit, and assuring each image has an intensity necessary to maintain clarity thereof even upon further finishing of the cereal pieces. In accordance with specific operational embodiments of the invention, line speeds greater than 100 ft/minute, preferably between 130-250 ft/minute (but potentially even higher) and more preferably between 150-200 ft/minute, were employed and found to provide a consistent flow of strips as needed, preferably with the inclusion of a controlled, variable speed conveyor assembly as described above. Without a consistent flow, undesirable surging of the strips can develop. If the surges are experienced at the printer, ghosting or shadowing occurs, resulting in poor, unacceptable imaging. If the surging continues into the cutting assembly, the images may not be properly centered or even within the periphery of the resulting cereal piece. If the line/belt speed is too fast, the conveyor belt will pull the strips to a point where the stretch overcomes the friction between the belt and the strips, causing the strips to spring back. Too slow and the strips start to overlap on top of each other. In addition to line speed, the use of the roll bars assist in the uniform conveyance by maintaining the strips in contact with the conveyor, thereby preventing the strips from having regions with slack which enables bounce and causes surging. To this end, a belt with a rough surface or even a vacuum belt could be employed in preventing strip surging.

Certainly, the printing operation is also extremely important. As indicated above, ink jet print heads were found to be effective, particularly as opposed to the use of print rolls. However, surprisingly, employing an extremely high dpi print head in an attempt to create sharp, high resolution images was actually determined to be much less effective. Instead, although perhaps counterintuitive given the potential for ghosting or shadowing of the images, overlaying multiple images using medium dpi print heads (e.g., 600 dpi) was relied upon to produce superior sharpness and intensity characteristics, enabling the images to be visually clear even upon further finishing of the cereal pieces. Again, multiple superimposed images are needed, with preferred results being obtained with re-printing the image upon itself in the section of the exposed face portion multiple times, with a total of 3-4 layered prints being most preferred for desired intensity. In addition, the printing is synced with the frequency of the cuts, such as by employing an encoder on the cutter gear box and allowing the print timing to be adjusted in-line with the cut frequency through control system 120. In any case, by establishing and synergistically controlling the various conveying, slitting, printing and cutting operations in accordance with the invention, a minimum of 75%, but actually up to 90% or even 100%, of the mass produced cereal pieces are created with sharp, substantially centered images entirely located with the peripheries of the pieces at the high production speeds employed.

Although described with reference to preferred embodiments of the invention, it should be understood that various changes and/or modifications can be made without departing from the invention. In particular, although the exemplary images referenced in the above discussion were emojis, it should be understood that a wide range of images could be created, including faces, flags, words, names, animals, musical notes and logos, just to name a few. In addition, although the embodiment described provides for the dough sheet being slit before the printing occurs, this need not be the case as the printing can be performed on the sheet and then the cereal pieces cut from the printed sheet. In such a case, the entire dough sheet would be considered one strip of dough for purposes of the invention. Furthermore, it should be recognized that, although the entire dough sheet is shown being printed upon, it is possible to print on only a portion of the sheet, e.g., 25-50%, so that the production line produces a combination of plain and image containing cereal pieces which are packaged together. This partial sheet printing can be done in various ways, including printing on only select ones of the strips or staggering the printing/not printing on any given strip. Of course, plain and image cereal pieces could also be separately produced and then mixed before packaging. In any case, the invention is only intended to be limited by the scope of the following claims.

The invention claimed is:

1. A method of mass producing cereal pieces comprising:
   directing a plurality of strips with a strip of dough material along a conveyor, with the strip having an exposed face portion and being one of the plurality of strips;
   creating, with a printing assembly, a series of images upon successive regions of the exposed face portion of the strip, wherein creating each image includes printing the image in a section of the exposed face portion and re-printing the image upon itself in the section of the exposed face portion multiple times and wherein the printing assembly is configured to print a respective said series of images upon successive regions of each of the plurality of strips;
   cutting, with a cutting unit, the strip into individual food pieces, each food piece including a periphery, with the image being located entirely within the periphery; and
   further finishing, with a finishing unit, the individual food pieces in creating cereal pieces having the images thereon.

2. The method of claim 1, wherein creating each image includes directing the strip of dough through a printing assembly including a set of aligned print units which successively print the image in the section of the exposed face portion.

3. The method of claim 2, wherein the set of aligned print units includes at least a first print head printing the image in the section of the exposed face portion a first time, a second print head re-printing the image upon itself in the section of the exposed face portion and a third print head again re-printing the image upon itself in the section of the exposed face portion.

4. The method of claim 1, wherein the image is printed in the section at least three times.

5. The method of claim 4, wherein the image is printed in the section four times.

6. The method of claim 1, further comprising:
   capturing image data of the cereal pieces with at least one camera of a control system;
   analyzing the image data with a CPU of the control system; and
   regulating production parameters based on the image data.

7. The method of claim 6, wherein the production parameters include one or more of a speed of the conveyor, a rate in which the image is printed and re-printed on the strip, and an operational speed of a cutting unit used in cutting the strip into individual food pieces.

8. The method of claim 1, wherein the strip of dough material constitutes a sheet of dough directed along the conveyor and then slit into a plurality of strips, wherein a respective said series of images are printed on each of the plurality of strips.

9. The method of claim 8, further comprising, after slitting the sheet of dough and prior to printing the series of images, directing the plurality of strips under a locator unit which maintains the plurality of strips against the conveyor.

10. The method of claim 8, further comprising guiding the plurality of strips through a printing assembly including a set of aligned print units for each of the plurality of strips, with each of the set of aligned print units successively printing the image in the section of the exposed face portion of a respective one of the plurality of strips.

11. The method of claim 10, wherein cutting the strip includes simultaneously cutting the plurality of strips in order to create a plurality of cereal pieces each having a respective said image thereon.

12. The method of claim 1, wherein further finishing the individual food pieces includes at least one of drying, puffing, toasting and topping the cereal pieces with the images thereon.

13. The method of claim 1, wherein the images constitute emojis.

14. The method of claim 1, wherein each image encompasses between about 40-80% of a side surface area of a respective said cereal piece.

15. The method of claim 1, wherein the conveyor is operated at line speeds between 130-250 ft/minute.

16. A production system for mass producing cereal pieces comprising:
   a conveyor configured to direct a plurality of strips with a strip of dough material having an exposed face portion being one of the plurality of strips;
   a printing assembly configured to create a series of images upon successive regions of the exposed face portion of the strip, wherein the printing assembly is configured to create each image by printing the image in a section of the exposed face portion and re-printing the image upon itself in the section of the exposed face portion multiple times and wherein the printing assembly is configured to print a respective said series of images upon successive regions of each of the plurality of strips;
   a cutting unit configured to cut the strip into individual food pieces, with each food piece including a periphery and the image being located entirely within the periphery; and
   a finishing unit configured to process the individual food pieces in creating cereal pieces having the images thereon.

17. The production system of claim 16, wherein the printing assembly includes a set of aligned print units configured to successively print the image in the section of the exposed face portion.

18. The production system of claim 17, wherein the set of aligned print units includes a first print head configured to print the image in the section of the exposed face portion a first time, a second print head configured to re-print the image upon itself in the section of the exposed face portion and a third print head configured to again re-print the image upon itself in the section of the exposed face portion.

19. The production system of claim 16, further comprising a slitter assembly, said conveyor being configured to direct a sheet of the dough material to the slitter assembly and said slitter assembly being configured to slit the sheet into the plurality of strips.

20. The production system of claim 19, further comprising at least one locator unit, located between the slitter assembly and the printing assembly, configured to maintain the plurality of strips against the conveyor.

21. The production system of claim 19, wherein the cutting unit is configured to simultaneously cut the plurality of strips in order to create a plurality of cereal pieces each having a respective said image thereon.

22. The production system of claim 16, wherein the finishing unit is configured to dry, puff, toast and/or apply a topping to the cereal pieces with the images thereon.

23. The production system of claim 16, wherein the printing assembly is configured to print images in the form of emojis.

24. The production system of claim 16, wherein the cutting unit is configured to cut the strip such that each image encompasses between about 40-80% of a side surface area of a respective said cereal piece.

25. The production system of claim 16, wherein the conveyor is configured to operate at line speeds between 130-250 ft/minute.

26. The production system of claim 16, further comprising a control system including:
   at least one camera configured to capture image data of the cereal pieces;
   a CPU configured to analyze the image data; and
   controls configured to regulate production parameters based on the image data.

27. The production system of claim 26, wherein the control system further includes at least one sensor for sending data related to a speed of the conveyor to the CPU for regulating the production parameters.

28. The production system of claim 27, wherein the production parameters include one or more of a speed of the conveyor, a rate of operation of the printing assembly, and an operational speed of the cutting unit.

\* \* \* \* \*